United States Patent [19]

Matsuda et al.

[11] 4,424,016
[45] Jan. 3, 1984

[54] GRANULATING APPARATUS

[75] Inventors: Masami Matsuda; Koichi Chino; Kazuhiko Kudo, all of Hitachi, Japan

[73] Assignee: Hitachi, Ltd., Tokyo, Japan

[21] Appl. No.: 333,628

[22] Filed: Dec. 22, 1981

[30] Foreign Application Priority Data

Dec. 23, 1980 [JP] Japan .................................. 55-181265

[51] Int. Cl.³ .............................................. B29C 3/02
[52] U.S. Cl. .................................... 425/144; 264/40.7; 264/140; 425/145; 425/162; 425/294; 425/DIG. 101
[58] Field of Search ............... 425/144, 294, 145, 162, 425/DIG. 101; 264/140, 40.7

[56] References Cited

U.S. PATENT DOCUMENTS 2,977,214  3/1961  McLellan ............................ 264/140
3,114,930 12/1963  Oldham et al. ..................... 264/140
3,366,717  1/1968  Rohaus ................................ 425/144
4,081,229  3/1978  Moore ................................. 425/144

Primary Examiner—Lorenzo B. Hayes
Attorney, Agent, or Firm—Thomas E. Beall, Jr.

[57] ABSTRACT

A granulating apparatus comprising a device which adds a binder of an epoxy resin or the like into a powder to-be-treated, a screw feeder which conveys the powder to-be-treated containing the binder, and rolls which compression-molds it. By rotating the screw feeder and the rolls, the powder to-be-treated is caused to induce internal friction and to generate heat, thereby to temporarily dissolve the binder, whereupon the powder to-be-treated is pelletized. In order to temporarily dissolve the binder, the granulating apparatus is equipped with a device for measuring the temperature of the powder to-be-treated, and a controller for controlling the stirring speed of the screw feeder and the molding speed of the rolls on the basis of the measured value so as to establish a desired temperature.

11 Claims, 9 Drawing Figures

4,424,016

GRANULATING APPARATUS

BACKGROUND OF THE INVENTION

This invention relates to a granulating apparatus, and more particularly to a granulating apparatus suited to form pellets of which a high density and a high strength are required.

It has been known that the dried powder of a radioactive waste is compressed and molded into pellets by a granulating apparatus in order to reduce the volume thereof, the pellets being kept in custody or disposed of. Since, however, the dried powder is liable to disperse when left intact and is difficult to mold by merely compressing it, it needs to be granulated by adding a binder thereto. Therefore, a liquid binder used also in other fields, such as water glass and liquid resin, has heretofore been added to the dried powder of the radioactive waste. Since, however, such binders hitherto used are viscous in the liquefied condition, the powdery mixtures containing them adhere to a mixer or piping, resulting in contaminating equipment and shortening the lifetimes thereof. Moreover, any of the binders hitherto used requires a solidifying period of time of 1-10 days. Accordingly, in case of treating an elastic and hygroscopic waste such as ion-exchange resin, the pellets obtained by the compression-molding expand again in the solidifying period of time, to incur lowering in the volume reduction ratio. In addition, the strength of the pellets themselves degrade.

SUMMARY OF THE INVENTION

An object of this invention is to solve the disadvantages of the prior-art methods, and to provide a granulating apparatus which facilitates the use of a binder free from the contamination of equipment, and the lowering of the volume reduction ratio or the degradation of pellets.

To the end of accomplishing the object, the inventor first considered to change the binder. The powder of a thermosetting resin or a thermoplastic resin such as polyethylene was added in the solid condition exhibiting no viscousness. In only the case of compression-molding a powder to-be-treated into pellets, a high temperature state was established, and the binder was temporarily liquefied so as to present viscousness. It has been revealed, however, that when the high temperature state in the case of the compression molding is intended to be established by a heater built in a granulating apparatus, the whole apparatus becomes complicated and gigantic. Besides, pellets obtained are not uniform.

In this invention, therefore, the binder is temporarily liquefied by exploiting the fact that the powder to-be-treated causes internal friction and generates heat by the rotations of the screw feeder and rolls of a granulating apparatus. In order to control the state of the binder, the granulating apparatus is equipped with means for sensing the temperature of the powder to-be-treated, and means for controlling the rotational frequency of at least one of the screw feeder and the rolls on the basis of the signal provided by the temperature sensing means.

According to this invention, the granulation is carried out in such a way that the powder temperature in the case of compression-molding the powder to-be-treated into the pellets is controlled into the viscous range of the binder. Therefore, the binder exceeds its melting point and can be viscous in the liquefied condition for only the slight period of time during which the powder to-be-treated is compression-molded. This can bring forth the effects of preventing the contamination of the equipment, enhancing the volume reduction ratio and stabilizing the strength of the pellets.

In addition to polyethylene mentioned above, the binder to be used in the granulating apparatus of this invention may be a material which is thermosetting or thermoplastic and which has a binder effect, for example, an epoxy resin, polyvinyl acetate or polyurethane. The temperature control of the apparatus according to this invention can be made easy and multifarious by properly or conjointly using the different melting points of such polymers.

The apparatus is, of course, applicable to the dried powder of any sort of radioactive waste. Even when applied to the compressive granulation of a non-radioactive powder such as of cellulose and coal, this invention is remarkably effective. Especially the cellolose powder is elastic, so that the effect of the invention is great.

The powder temperature can be measured at the outlet of a powder mixer, at the inlet and outlet of a hopper, immediately before the rolls, etc. Of course, a precise temperature detection is attained when the measurement is made in a plurality of places among them.

DESCRIPTION OF THE PREFERRED EMBODIMENTS

Figure 1:
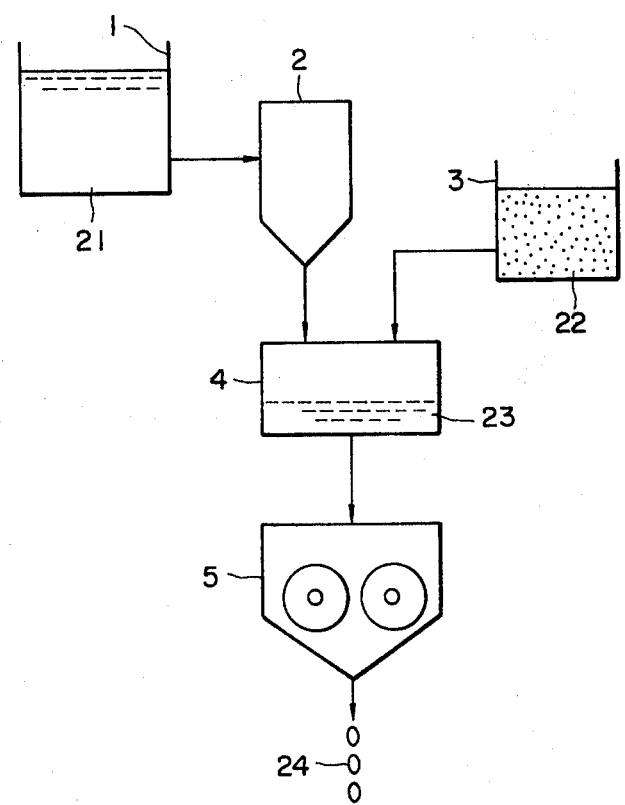
FIG. 1 is a schematic constructional view of a conventional radioactive waste disposal system.

FIG. 1 is a schematic constructional view of an example of a conventional radioactive waste disposal system. Referring to the figure, the system is constructed of a waste storage tank 1, a drier 2, a binder storage hopper 3, a powder mixer 4, and a granulating apparatus 5. A radioactive waste 21 is conveyed from the waste storage tank 1 to the drier 2 and is dried into powder. The resultant powder has a binder 22, fed from the binder storage hopper 3, added thereto by the powder mixer 4. A powder to-be-treated 23 thus prepared is compression-molded into pellets 24 by the granulating apparatus 5.

Figure 2:
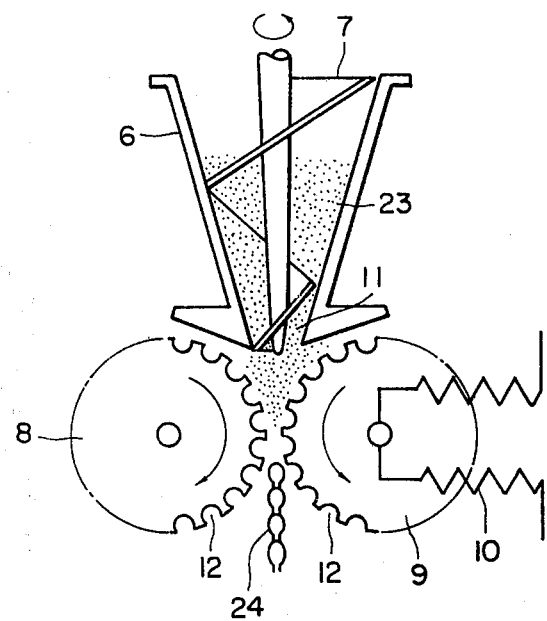
FIG. 2 is a sectional view of an example of a conventional granulating apparatus.

FIG. 2 is a sectional view showing an example of the granulating apparatus 5 more in detail. Referring to the figure, the apparatus is constructed of a hopper 6 being storage means, a screw feeder 7 being conveyance means, rolls 8 and 9 being granulation means, and pressing means 10. The screw feeder 7 is inserted in the funnel-shaped hopper 6 along the vertical center axis thereof. The two rolls 8 and 9 are opposingly juxtaposed under the hopper 6 and at the position at which they lie in substantial contact with an outlet 11 provided in the bottom of the hopper. When the powder to-be-treated 23 has been supplied into the hopper 6, the rotating screw feeder 7 pressingly lowers it to the outlet 11 in a bottom of the hopper while stirring it. Under the hopper 6, the roll 9 is pushed against the roll 8 by the pressing means 10 such as spring or hydraulic means. The powder to-be-treated 23 emitted from the hopper 6 is compression-molded into the pellets 24 according to granule-shaped pockets 12 carved in the outer peripheral surfaces of the rolls, in the interstice between the two rotating rolls.

Figure 3:
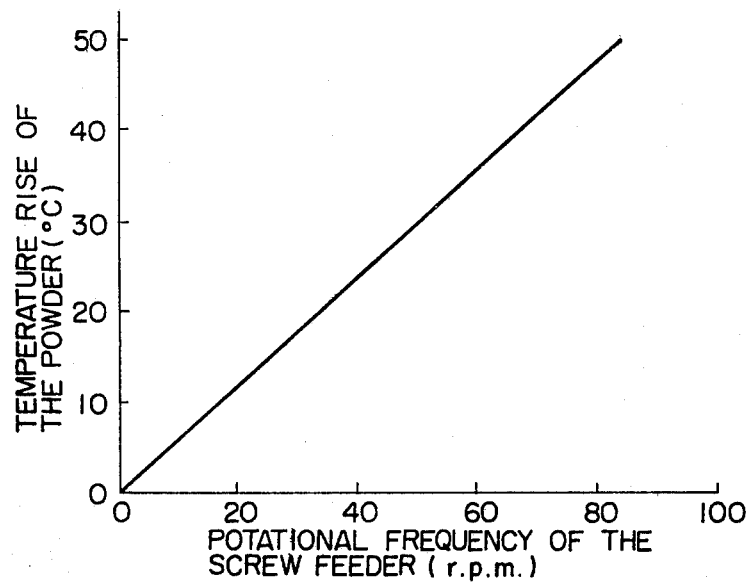
FIGS. 3 and 4 are graphs showing the temperature rise characteristics of a powder to-be-treated.
Figure 4:
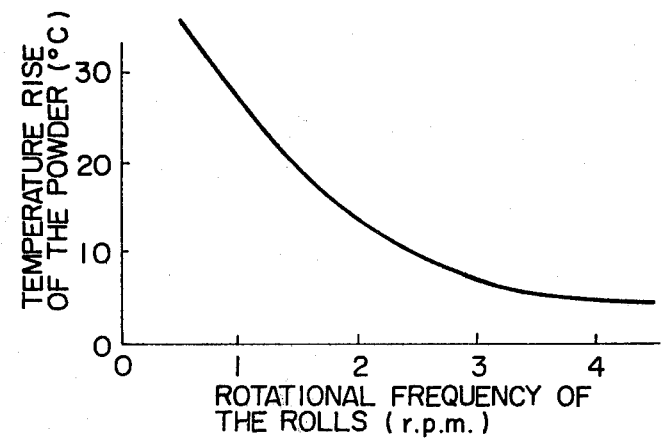

Here, the temperature rise of the powder to-be-treated during the granulation process will be explained. The rotational kinetic energy of the screw feeder as well as the rolls is transmitted to the powder to-be-treated in the manner of compression and is chiefly converted into the internal frictional heat between the powder granules, which heat raises the powder temperature as much as 20°-100° C. FIG. 3 is a graph showing the relationship between the rotational frequency of the screw feeder and the temperature rise of the powder to-be-treated. The example of the powder is an ion-exchange resin. The rotational frequency and the temperature rise form a proportional straight line, and it is understood that the rising width of the powder temperature increases with the rotational frequency of the screw feeder. As another way of viewing the graph, it is understood that, in order to raise the powder temperature by 30° C. with only the rotation of the screw feeder, the rotational frequency may be fixed at 50 r.p.m. FIG. 4 is a graph showing the relationship between the rotational frequency of the rolls and the temperature rise of the powder to-be-treated. Likewise, the example of the powder is the ion-exchange resin. The rotational frequency and the rise temperature present a descending curve similar to the inverse proportionality, and it is understood that the rising width of the powder temperature becomes rather smaller even when the rotational frequency of the rolls is increased. When the rotational frequency of the rolls is fixed at 1.5 r.p.m. by way of example, the temperature width to rise owing to only the rotation of the rolls can be conjectured 20° C. With the results of both the graphs combined, the rising width $\Delta T_P$ of the powder temperature within the apparatus is the sum between the temperature rise width $\Delta T_F$ according to FIG. 3 and the temperature rise width $\Delta T_R$ according to FIG. 4.

$$\Delta T_P = \Delta T_F + \Delta T_R$$

Figure 5:
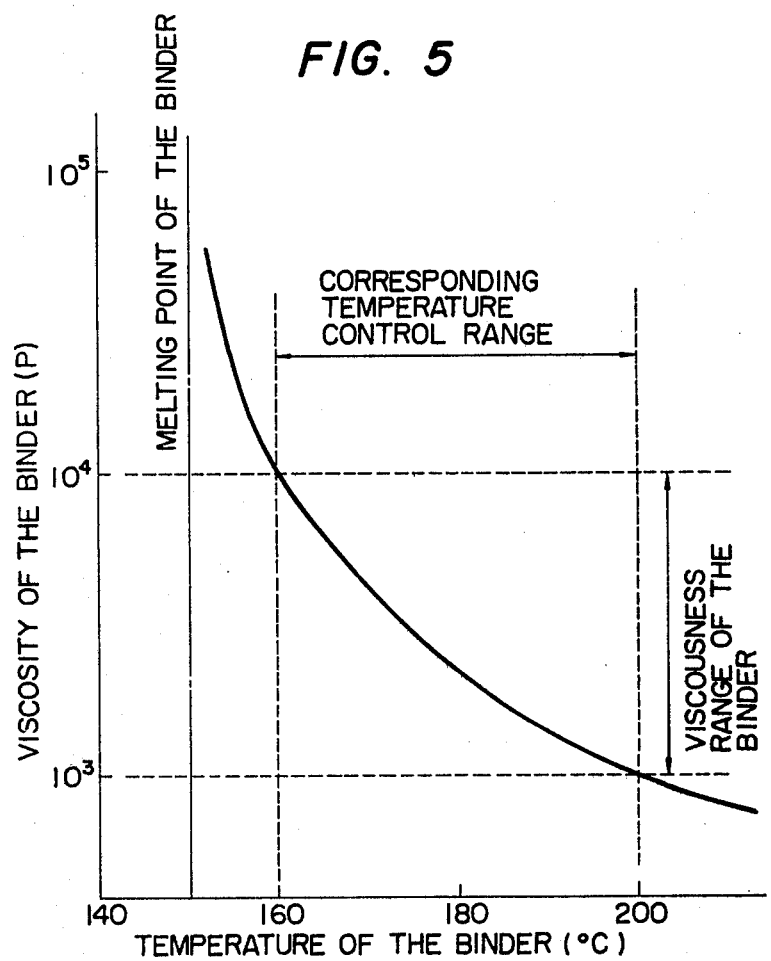
FIG. 5 is a graph showing the viscosity/temperature characteristics of a thermally dissolvable epoxy resin.

On the other hand, in order to use the powder of a thermally dissolvable substance as the binder, the temperature characteristics thereof must be grasped. FIG. 5 is a graph showing the relationship between the temperature and viscosity of the binder. The example of the binder is an epoxy resin. As seen from the graph, the binder melts to be liquid and demonstrates a viscousness at its melting point of 150° C. When the temperature has further risen, the viscousness is lost conversely. When the temperature has exceeded 200° C., the viscosity becomes $10^3$ P or below, so that the binder demonstrates no viscousness. It is accordingly understood that, when the viscousness range of the binder is supposed $10^4-10^3$ P, the corresponding temperature control range ought to be made 180±20° C. Therefore, when the desired powder temperature $T_P$ in the case of compression-molding the power to-be-treated into the pellets is set within this range and simultaneously the powder temperature $T_M$ immediately before being fed into the granulating apparatus can be measured, the desired rise width $\Delta T_P'$ of the powder temperature is obtained with the following equation:

$$\Delta T_P' = T_P - T_M$$

It is the aim of the present invention to control the desired rise width $\Delta T_P'$ and the actual temperature rise width $\Delta T_P$ within the apparatus so as to coincide with each other.

Figure 6:
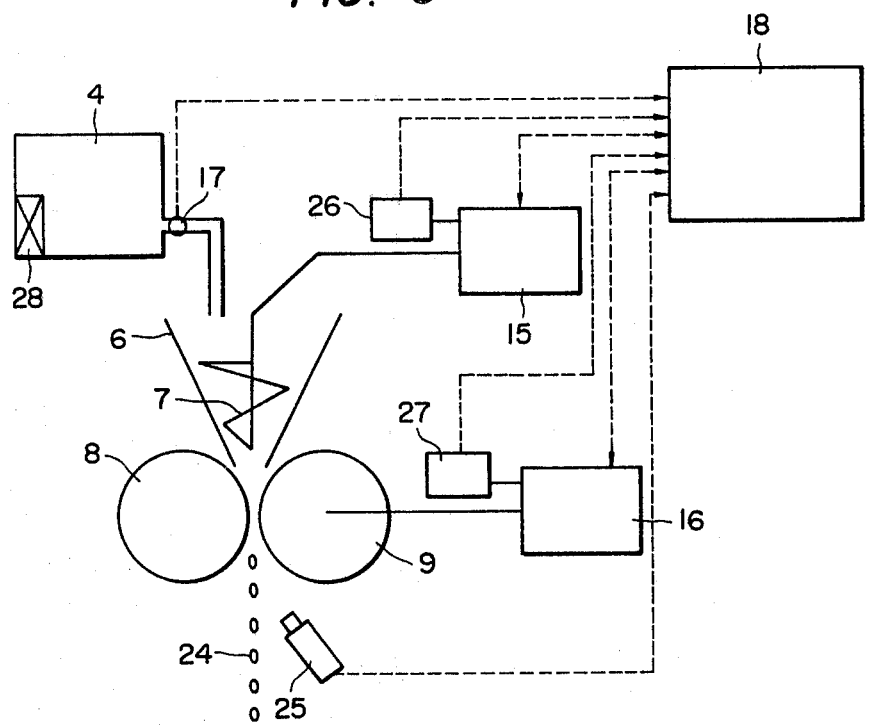
FIG. 6 is a schematic constructional view of an embodiment of a granulating apparatus according to this invention.

FIG. 6 is a schematic constructional view of a granulating apparatus embodying this invention. Referring to the figure, the apparatus is constructed of a powder mixer 4, a hopper 6, a screw feeder 7, rolls 8 and 9, a motor 15 for driving the screw feeder, a motor 16 for driving the rolls, a thermocouple 17 and an infrared thermometer 25 being temperature sensing means, a wattmeter 26 for the screw feeder driving motor and a wattmeter 27 for the roll driving motor being power measuring means, and a controller 18 being speed control means. The screw feeder driving motor 15 and the roll driving motor 16 are disposed so as to rotate the screw feeder 7 and the roll 9 (or 8), respectively. The thermocouple 17 for measuring the powder temperature immediately before the powder is supplied into the granulating apparatus is attached to the outlet of the powder mixer 4 which is substantially equal in temperature to the inlet of the hopper 6. The infrared thermometer 25 measures in the non-contact fashion the temperature of pellets immediate after granulation, this temperature being substantially equal to the final temperature in the case of compression-molding the powder to-be-treated into the pellets, and is disposed under the roll 9 (or 8). The controller 18 is a controlling minicomputer, which is electrically connected with the thermocouple 17, the infrared thermometer 25, the two driving motors 15 and 16 and the two motor wattmeters 26 and 27. The other appliances are constructed substantially in the same manner as in the case explained with reference to FIGS. 1 and 2. In the controller 18, the temperature rise characteristics in FIGS. 3 and 4 and the desired value $T_P$ of the powder temperature in the case of compression-molding the powder to-be-treated into the pellets are stored in advance. Here, the temperature rise characteristics in FIGS. 3 and 4 are uniquely determined by the composition of the powder to-be-treated, while the set value $T_P$ of the powder temperature is uniquely determined by the type or characteristics of the binder.

Since the rotational frequency of the rolls is proportional to the amount of emission of the pellets, in other words, the quantity of disposal of the waste, it should desirably be constant as the waste disposal system. The constant value thereof is also set in the controller 18 in advance. This also determines the rising width $\Delta T_R$ of the powder temperature owing to the rotation of the rolls. When, besides the aforecited settings, the thermocouple 17 has measured and reported the temperature $T_M$ of the powder to-be-treated at the outlet of the powder mixer 4, the controller 18 having obtained all the necessary data calculates:

$$\Delta T_F = \Delta T_P - \Delta T_R$$
$$= T_P - T_M - \Delta T_R$$

It determines an appropriate rotational frequency of the screw feeder on the basis of the characteristic curve of FIG. 3, and delivers it to the screw feeder driving motor 15.

In order to confirm that the rise components $\Delta T_F$ and $\Delta T_R$ of the powder temperature owing to the screw feeder and the rolls are their set values, they are calculated within the controller 18 from the values of the two motor wattmeters 26 and 27 by considering the thermal balance including the efficiency of conversion from electric energy into heat energy, the proportion of heat radiation, etc. These values can also be calculated by measuring the torques of the screw feeder and the rolls. Further, the fact that the final powder temperature is equal to $T_P$ is confirmed by measuring the temperature of the granulated pellets with the infrared thermometer 25. The confirmation of the power values and the powder temperature rise component by the infrared thermometer makes it possible to obtain rigid pellets stably even when the composition of the powder to-be-treated has changed to shift the temperature rise characteristics of FIGS. 3 and 4. More specifically, in case where the composition of the powder to-be-treated has changed and where the temperature rise of the powder to-be-treated owing to the screw feeder or the rolls has deviated from the value obtained from FIG. 3 or FIG. 4, the change or deviation is detected from the power values or by the infrared thermometer, and a feedback signal is applied from the controller 18 to the screw feeder driving motor 15 in order to change the rotational frequency of the screw feeder so as to attain the desired final powder temperature $T_P$.

This control will be described in connection with examples. The first example is a case where the waste is the ion-exchange resin the temperature rise characteristics of which are illustrated in FIGS. 3 and 4. The binder is the powder of an epoxy resin, and the desired powder temperature $T_P$ in the compression-molding is set at 170° C. When the rotational frequency of the rolls is determined to be 1.5 r.p.m., the temperature rise $\Delta T_R$ owing to the rotation of the rolls is 20° C. as explained with reference to FIG. 4. Further, assuming that the powder temperature $T_M$ at the outlet of the powder mixer as measured by the thermocouple is 120° C., the temperature difference $\Delta T_F$ which is raised by the rotation of the screw feeder is 30° C. from the calculation:

$$\Delta T_F = 170 - 120 - 20 = 30$$

As explained with reference to FIG. 3, this corresponds to 50 r.p.m. in terms of the rotational frequency of the screw feeder. The controller may provide the value. In an experiment, when the powder temperature $T_M$ at the outlet of the mixer 4 was varied in a range of 100° C. to 140° C., the controller 18 controlled the rotational frequency of the screw feeder 7 into a range of 15 r.p.m. to 80 r.p.m. to compression-mold the powder-to-be treated into pellets.

In other words, the powder to-be-treated in the period in which it undergoes the temperature of from 120° C. to 150° C. owing to the rotation of the screw feeder 7 lies below the melting point of the binder, and neither the hopper 6 nor the screw feeder 7 is contaminated. Thereafter, on the basis of the rise of the powder temperature owing to the rotation of the rolls, the binder exceeds the melting point of 150° C. and is liquefied. In the case of compression-molding the powder to-be-treated into the pellets, the binder demonstrates the viscousness at the desired temperature of 170° C. However, the pellets touch the atmosphere when emitted from the rolls, and they are rapidly cooled to return to the temperature below the melting point of the binder. They are perfectly solidified soon. Even when the powder to-be-treated is an elastic and hygroscopic one such as the ion-exchange resin, the expansion of the pellets after the granulation does not take place, and a large volume-reduction ratio is attained. The effect is indicated in Table 1. Table 1 lists the results of an experiment in which the volume reduction ratio based on the invention method adding the epoxy resin powder as the binder was made unity and was compared with those of the prior-art method using water glass and a method adding no binder.

TABLE 1

| Binder | Volume reduction ratio |
|---|---|
| This invention | 1 |
| Water glass | 0.7 |
| Not added | 0.5 |

Figure 7:
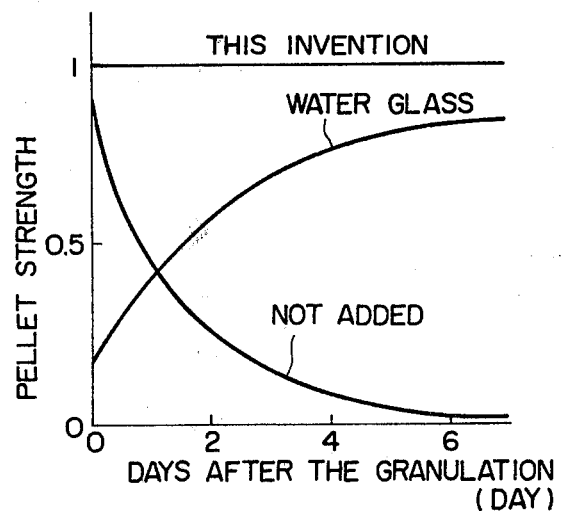
FIG. 7 is a graph for comparing the variations of pellet strengths.

In addition, since the solidification of the pellets proceeds rapidly, the degradation of the pellet strength does not occur, either. FIG. 7 is a graph showing how the pellet strength changed with the lapsed days after the granulation by each of the methods in Table 1, under the condition that the pellet strength immediately after the granulation according to this invention was made unity. As seen from the graph, in the case of adding no binder, the strength lowers quickly due to the expansion of the pellets, and in the case of employing water glass as the binder, a period in which the pellets are very fragile exists before the progress of the solidification immediately after the granulation. In contrast, the pellets according to this invention exhibit a stable strength surpassing the strength of the case of water glass consistently since the time immediately after the granulation.

Figure 8:
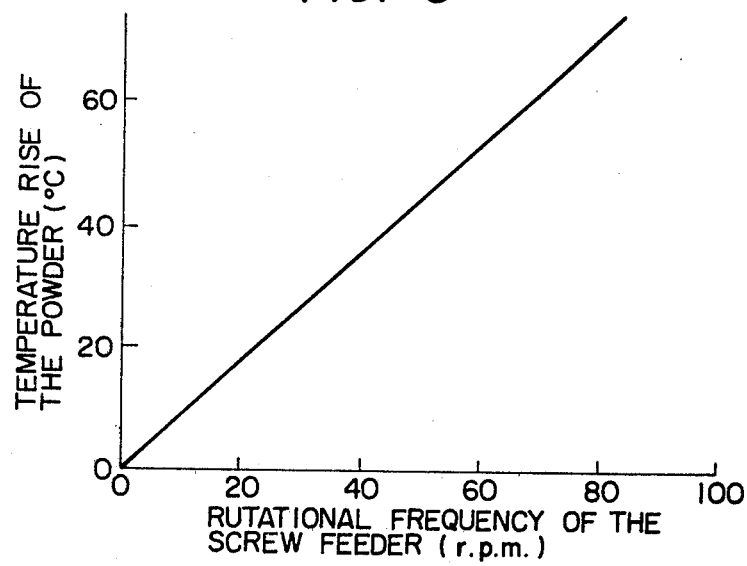
FIGS. 8 and 9 are graphs showing the temperature rise characteristics of another powder to-be-treated.
Figure 9:
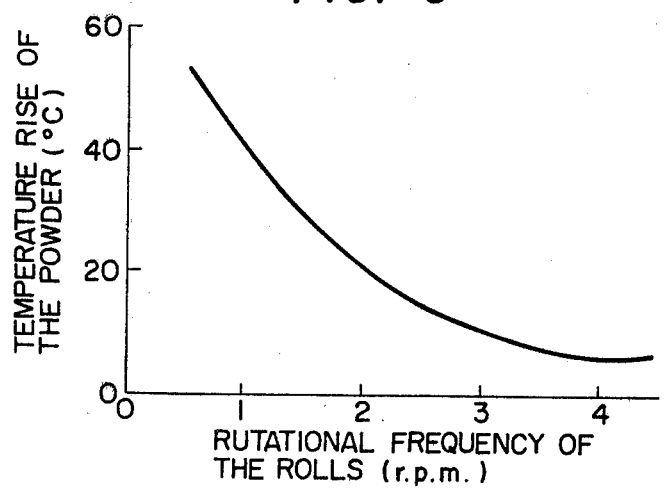

The second example is a case where the waste is sodium sulfate whose temperature rise characteristics differ from those of the ion-exchange resin illustrated in FIGS. 3 and 4. The principal radioactive wastes which are produced from a BWR type nuclear power plant are the ion-exchange resin and a sodium sulfate. Since the actual powder to-be-treated is a mixture consisting of the two substances, these are referred to. FIGS. 8 and 9 illustrate the temperature rise characteristics of the sodium sulfate powder. As compared with the ion-exchange resin illustrated in FIGS. 3 and 4, the sodium sulfate is larger in the rise temperature by about 50% at the identical rotational frequency of the screw feeder or the rolls. This is ascribable to the fact that the friction factor between the powdery particles is greater in the sodium sulfate powder than in the ion-exchange resin. Sodium sulfate having such characteristics is pelletized by the granulating apparatus according to this invention. It is to be understood that when the temperature rise characteristics in FIGS. 8 and 9 are stored in the controller 18 in advance, rigid pellets are obtained by the same method as in the foregoing example of the ion-exchange resin.

However, the present example is intended to indicate that the sodium sulfate powder can be granulated into rigid pellets even when the temperature rise characteristics of the ion-exchange resin illustrated in FIGS. 3 and 4 are used. Hereunder, the details will be stated. As in the preceding example in which the waste is the ion-exchange resin, the epoxy resin powder is employed as the binder, the desired powder temperature $T_P$ in the compression-molding and the rotational frequency of the rolls are respectively set at 170° C. and 1.5 r.p.m., and the temperature rise characteristics illustrated in FIGS. 3 and 4 are stored in the controller 18. When, under this state, sodium sulfate whose powder temperature $T_M$ is 120° C. is supplied from the powder mixer 4 into the granulating apparatus 5, the controller 18 calculates the temperature rise $\Delta T_R$ owing to the rotation of the rolls as being 20° C., by referring to FIG. 4. Further, assuming the rotational frequency of the screw feeder to be 50 r.p.m., it calculates that the temperature rise $\Delta T_F$ owing to the rotation of the screw feeder is 30° C. and that the total temperature $T_P$ is 170° C. As a result, the controller 18 provides an output so as to make the rotational frequency of the screw feeder 50 r.p.m. Since, however, the powder to-be-treated is sodium sulfate, the temperature is actually raised 30° C. by the rolls and 45° C. by the screw feeder as seen from FIGS. 8 and 9, and the final powder temperature $T_P$ becomes 195° C. Such temperature rise greater than is necessary is detected from the values of the wattmeters 26 and 27 respectively mounted on the screw feeder and roll driving motors or from the value of the infrared thermometer 25 disposed under the roll. The controller 18 having detected the situation calculates from the power value of the roll driving motor that the temperature rise $\Delta T_R$ is 30° C., and finds that the temperature rise $\Delta T_F$ owing to the rotation of the screw feeder may be 20° C. In addition, it calculates from the power value of the screw feeder driving motor that the temperature rise $\Delta T_F$ is 45° C. when the rotational frequency of the screw feeder is 50 r.p.m. Further, by exploiting the fact that the proportional relation holds between the rotational frequency of the screw feeder and the temperature rise of the powder as illustrated in FIG. 3 or FIG. 8, the controller 18 calculates that the rotational frequency of the screw feeder may be 22 r.p.m. in order to make $\Delta T_F 20°$ C. It delivers the corresponding output to the screw feeder driving motor. It has been confirmed that, by forming such feedback loop, rigid pellets are stably obtained even when the composition of the powder to-be-treated has changed. When, in the apparatus, the powder temperature $T_M$ at the outlet of the powder mixer 4 was varied in a range of 100° C. to 130° C., the controller 18 controlled the rotational frequency of the screw feeder 7 into a range of 10 r.p.m. to 45 r.p.m., and stable pellets of great volume-reduction ratio were obtained as in the case of the ion-exchange resin powder.

As described above, the temperature of the powder to-be-treated rises 20° to 100° C. during the granulation process. In case where the difference between the desired powder temperature in the case of compression-molding the powder to-be-treated into the pellets and the powder temperature before the granulation is below 20° C. or above 100° C., a heater or cooler 28 may be disposed in the powder mixer 4 as shown in FIG. 6 so as to heat or cool the temperature of the powder into the controllable range in advance.

I claim:

1. A granulating apparatus including: means supplying a powder to be treated, means supplying a binder made of a thermoplastic or thermosetting resin, means mixing the binder into the powder to be treated, granulation means having a pair of rolls with opposed interstices and compression molding the powder to be treated and binder into pellets, screw feeder means which feeds the powder to be treated with the binder mixed therein into the interstices between said rolls while stirring the powder to be treated, driver means which drive said screw feeder means and said rolls respectively, temperature detector means which measures a temperature of the powder to be treated, and controller means which controls a rotational frequency of at least one of said screw feeder means and said rolls on the basis of the powder temperature measured by said temperature detector means.

2. A granulating apparatus according to claim 1, wherein said temperature detector means is a detector for a pellet temperature, and said controller means corrects the rotational frequency of at least one of said screw feeder and said rolls on the basis of the pellet temperature measured by said detector.

3. A granulating apparatus including: means supplying a powder to be treated, means supplying a binder made of a thermoplastic or thermosetting resin, means mixing the binder into the powder to be treated, granulation means having a pair of rolls with opposed interstices and compression molding the powder to be treated and binder into pellets, screw feeder means which feeds the powder to be treated with the binder mixed therein into the interstices between said rolls while stirring the powder to be treated, driver means which drive said screw feeder means and said rolls respectively, temperature detector means which measures a temperature of the powder to be treated, detector means which measures either torques or driving forces of said screw feeder means and said rolls, computer means which calculates the powder temperature in the molding by said rolls on the basis of the measured values, and controller means which controls a rotational frequency of at least one of said screw feeder means and said rolls so as to bring the calculated powder temperature into a fixed range in which said binder lies above its melting point and is highly viscous.

4. A granulating apparatus according to claim 3, wherein said temperature detector means is a detector for a pellet temperature, and said controller means corrects the rotational frequency of at least one of said screw feeder means and said rolls on the basis of the pellet temperature measured by said detector.

5. In a granulating apparatus having storage means to store therein a powder to-be-treated with a thermoplastic or thermosetting resin added thereto, conveyance means to convey the powder to-be-treated to an outlet of the storage means within this storage means while stirring it, and granulation means disposed at the outlet of the storage means and to compress and mold the powder to-be-treated; control apparatus comprising temperature sensor means to sense a temperature of the powder to-be-treated at a suitable position in a passage of the powder to-be-treated extending from an inlet of said storage means to an outlet of said granulation means, and speed control means to control a stirring speed of said conveyance means or/and a compressing and molding speed of said granulation means on the basis of the signal of said temperature sensor means.

6. A granulating apparatus according to claim 2, further including second temperature detector means for measuring the temperature of the powder to be treated, including binder, at the inlet of said screw feeder means; said controller means having stored therein the temperature rise from inlet to outlet versus rotational speed characteristics of said screw feeder means and said granulation means, and the fixed desired temperature of the pellets as they exit from said rolls; and said controller means maintaining the speed of said rolls at the fixed desired output flow for said granulating apparatus, determining the temperature change imparted to the powder to be treated at said fixed roll speed, and subtracting both the temperature change provided by said granulation means and the temperature of the powder to be treated at the inlet of said screw feeder means from the stored fixed desired temperature at the outlet of said granulation means to determine the fixed desired temperature change within said screw feeder means, and controlling the speed of said screw feeder means to a fixed value that in accordance with the stored information will produce the desired screw feeder means temperature rise of the powder to be treated; and said controller means further comparing the actual measured temperature of the powder to be treated leaving said granulation means as determined by said first-mentioned temperature detector means with the stored, fixed, desired temperature of the powder to be treated leaving said granulation means to produce a temperature differential, and controlling the speed of said screw feeder means in accordance with said temperature differential.

7. A granulating apparatus according to claim 2, including means for measuring the power consumed by said screw feeder means and the power consumed by said granulation means separately and respectively; second temperature detector means for measuring the temperature of the powder to be treated as it enters said screw feeder means; said controller means storing a desired fixed temperature of the powder to be treated leaving said granulation means; said controller means operating said granulation means at a fixed desired speed dependent upon the desired output of said granulating apparatus and thereby determining the heat input to said powder to be treated by said granulation apparatus; said controller means subtracting the measured input of said powder to be treated at the inlet of said screw feeder means and the temperature increase provided by said granulation means as determined from its power consumption from the stored, fixed, desired temperature of said powder to be treated leaving said granulation means and thereby determining the fixed, desired power input for said screw feeder means; said controller means further controlling the rotational speed of said screw feeder means in accordance with its measured power input and the determined desired power input.

8. A granulating apparatus according to claim 7, wherein said controller means further compares the actual measured temperature of said powder to be treated exiting said granulation means as determined by said first-mentioned temperature detector means with the stored desired fixed temperature and producing a temperature differential, and using said temperature differential to adjust the rotational speed of said screw feeder means.

9. A granulating apparatus including: means supplying a powder to be treated, means supplying a binder made of thermoplastic or thermosetting resin; means mixing the binder into the powder to be treated; granulation means having a pair of rollers with opposed interstices and compression-molding the powder to be treated and binder into pellets; screw feeder means which feeds the powder to be treated with the binder mixed therein into the interstices between said rolls while stirring the powder to be treated; driver means for driving said screw feeder means and said rolls respectively; temperature detector means for measuring a temperature of the powder to be treated within the apparatus; and controller means comparing the measured temperature of said powder to be treated with a fixed standard and producing a differential signal, and controlling the temperature of said powder to be treated in accordance with said differential signal.

10. A granulating apparatus according to claim 9, wherein said controller means provides and removes heat to and from, respectively, said powder to be treated in accordance with said differential signal to change the measured value of the powder to be treated temperature toward the fixed, stored, desired value.

11. A granulating apparatus according to claim 10, wherein said controller means only adds heat to or removes heat from the powder to be treated prior to its entry into said screw feeder means in an amount to maintain said differential signal within a fixed range; and said controller means further controlling the rotational speed of said screw feeder means to add frictional heat to said powder to be treated in accordance with said differential signal.

* * * * *